INVENTOR.
GENE J. COLTER
BY Warren F.B. Lindsley
ATTORNEY

INVENTOR.
GENE J. COLTER
BY Warren F. B. Lindsley
ATTORNEY

United States Patent Office 3,426,262

Patented Feb. 4, 1969

3,426,262

SYSTEM FOR CONTROLLING INTERMITTENT AND BIDIRECTIONAL OPERATION OF MOTORS

Gene J. Colter, Phoenix, Ariz., assignor to General Electric Company, a corporation of New York Filed Apr. 13, 1966, Ser. No. 542,333

U.S. Cl. 318—313 6 Claims

Int. Cl. H02p 5/00, 7/00; G05b 5/01

ABSTRACT OF THE DISCLOSURE

The system for controlling operation of motors employs a tachometer to generate pulses having a frequency which is determined by motor speed. A standard signal is compared with the pulses from the tachometer and a voltage is applied to the motor to regulate the motor speed.

Figure 1:
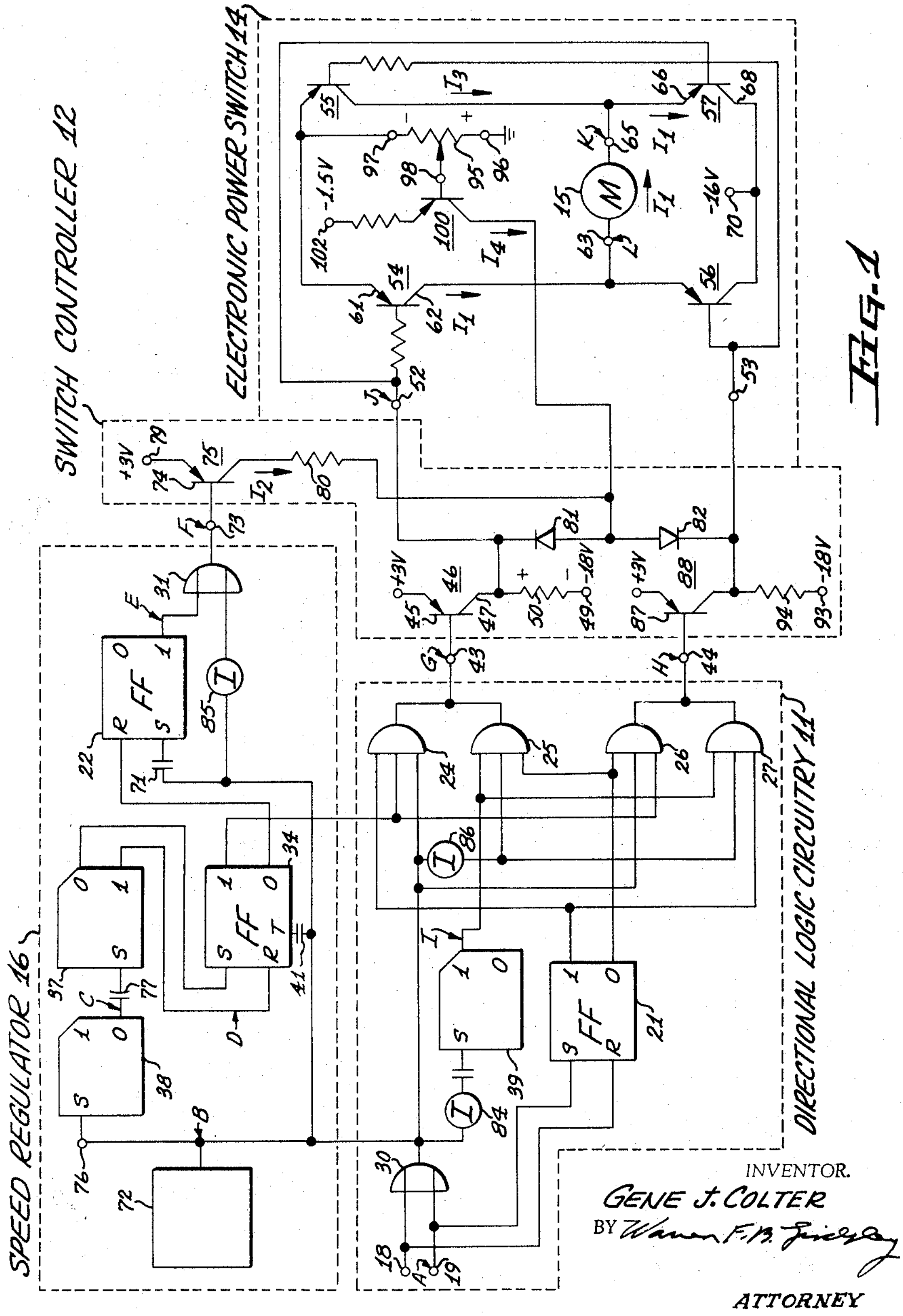

This invention relates to motor controls and more particularly to systems for precisely controlling intermittent and bidirectional operation of motors employed to rotate a magnetic tape drive capstan.

In high speed data processing systems, one commonly used data storage medium is an elongated tape of flexible plastic material employing a magnetic coating on one side thereof. Such a medium is commonly referred to as a magnetic tape and is used in tape handlers wherein tape from a supply reel is moved by a rotating capstan past a read/write head, to a take-up reel for storage. When a tape handler is employed in a computer system, it must be capable of moving tape at a high rate of speed in both forward and reverse directions and also must be capable of changing the direction of motion of the tape very rapidly. In addition to high speed, precise start-stop characteristics, such systems usually maintain the speed of the tape at a selected nominal velocity during the time that data is being read from or written on the tape.

In order to start and stop the tape as quickly as possible and to provide maximum data transfer capability for use with data processing systems, magnetic tape transports may employ a single drive capstan in constant engagement with the magnetic tape. This capstan may be driven in either a forward or a reverse direction by a bidirectional motor which is directly coupled to the drive capstan. Such a motor may be a D.C. motor having a low inertia armature. In addition to low armature inertia, this type of motor also has a substantially linear torque versus current characteristic over a relatively wide range so that the current through the motor armature may actively and completely control the operation of the single drive capstan.

Current to control the speed and direction of rotation of the motor armature is provided by a motor control system. In prior art motor control systems, a D.C. tachometer coupled to the motor develops a D.C. voltage which is proportioned to the motor speed. This voltage is compared to a D.C. reference signal by the servo amplifier which supplies power to the bidirectional motor. In prior art systems brush noise, change in the voltage output characteristics of the tachometer, amplifier drift, and drift of the D.C. reference voltage cause an eight percent or greater speed variation of the motor. Such a speed variation of the motor and the associated drive capstan of a magnetic tape transport may result in a misread of data from the magnetic tape. Accordingly, it is a feature of this invention to provide a new and improved motor control system wherein the variations in speed of the motor is less than one-tenth of one percent.

It is therefore one object of the present invention to provide an improved system for controlling the speed of a bidirectional motor.

Another object of this invention is to provide an improved motor speed control system wherein the speed of the motor can be more accurately controlled than in prior art systems.

A further object of this invention is to provide an improved system for controlling the motion of the capstan of a single capstan tape transport.

A still further object of this invention is to provide an improved speed control system for a motor employing means for quickly increasing the motor speed to a predetermined value and accurately controlling the motor at that speed.

In accordance with the invention claimed, a new and improved motor control system is provided wherein an optical tachometer coupled to the shaft of the motor develops pulses having a time duration between pulses which is determined by the speed of the motor. A standard pulse generator is employed for developing timing signals having a predetermined time duration. Comparison logic is utilized for comparing the time duration between tachometer pulses and the time duration of the timing signals, and to produce a speed control signal when the time duration between the tachometer pulses is greater than the time duration of the timing signals. This speed control signal closes a switch which causes current flow to the motor to increase thereby increasing the speed of the motor.

Figure 2:
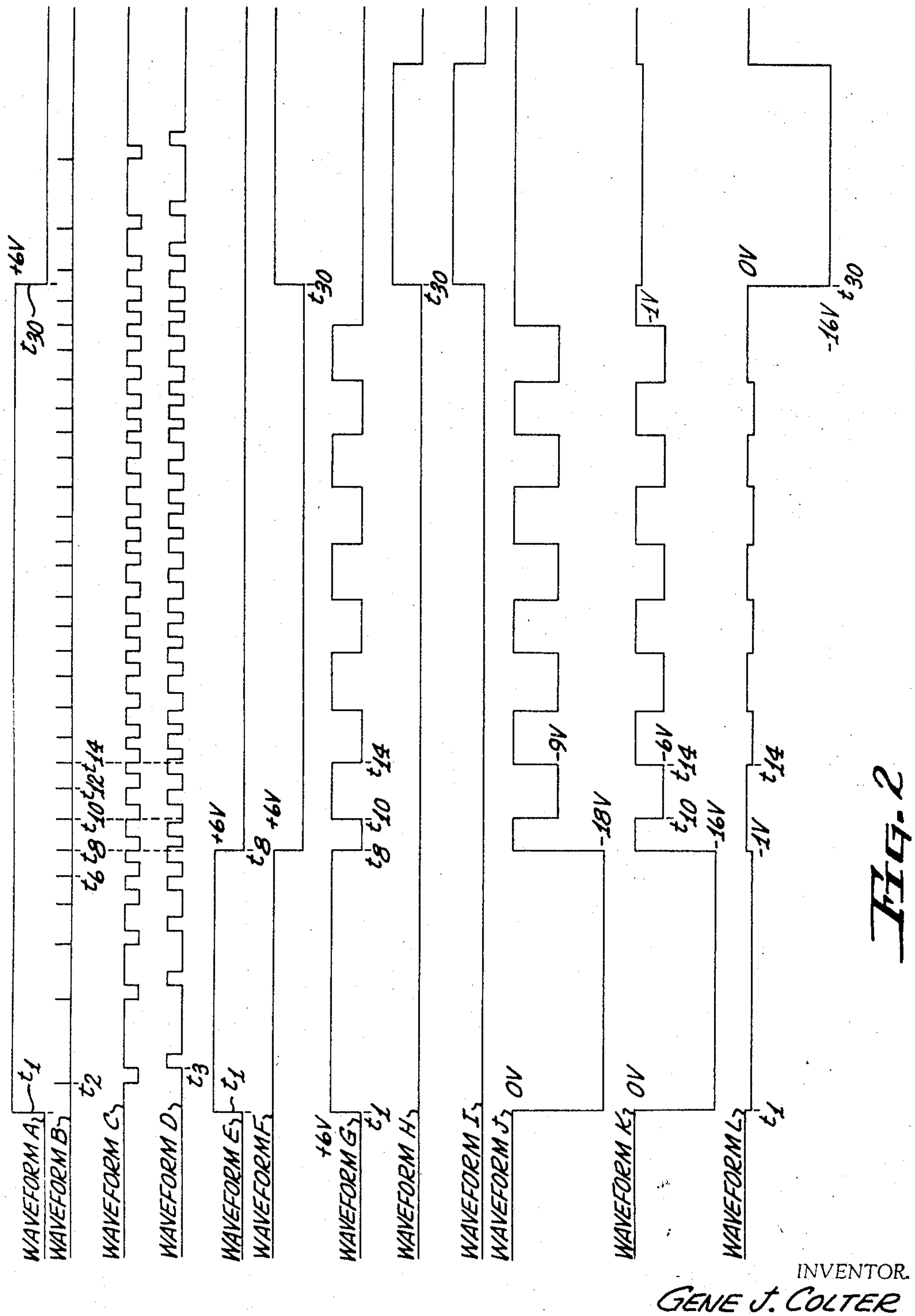

Other objects and advantages of this invention will become apparent from the following description when taken in connection with the accompanying drawings wherein:

FIG. 1 is a block diagram of the motor control system embodying the present invention; and, FIG. 2 illustrates waveforms useful in explaining the operation of the present invention.

Referring more particularly to the drawing by characters of reference, FIG. 1 discloses a motor control system employing directional logic circuitry 11 for receiving forward and reverse command voltages at terminals 18 and 19 and for supplying directional signals to a switch controller 12. Switch controller 12 supplies actuating signals to an electronic power switch 14 which is arranged to supply either full or patrial power to a D.C. motor 15 and to cause motor 15 to rotate in either a forward or a reverse direction. Motor 15 is coupled to a speed regulator 16 which compares the speed of the motor with a standard speed value and provides a speed control signal to switch controller 12 when the motor speed is less than a predetermined value. This signal causes controller 12 to close switch 14 and to supply increased power to the motor until the motor speed is slightly greater than this predetermined value. When the motor speed is slightly greater than this predetermined value, the controller opens the switch so that the motor is allowed to coast until the motor speed is again slightly less than this predetermined value.

A pair of OR-gates, a plurality of AND-gates, inverters and multivibrators provide control signals to switch controller 12.

The bistable multivibrator or flip-flop described herein is a circuit adapted to operate in either one of two stable states and to transfer from the state in which it is operating to the other stable state upon the application of an input signal thereto. In one state of operation, the flip-flop represents the binary 1 (1-state) and in the other state, the binary 0 (0-state). The two leads entering the left-hand side of the flip-flop symbols shown in FIG. 1 provides the input signals. One of the input leads, the set lead (S), receives a set input signal and the other input lead, the reset lead (R) provides a rest input signal. When the set input signal goes positive, the flip-flop is transferred to its 1-state if it is not already in the 1-state. When the reset input signal goes positive, the flip-flop is transferred to its 0-state if it is not already in the 0-state. The two leads leaving the right-hand side of the flip-flop symbols deliver the two output signals. One lead, the 0 output lead, delivers the 0 output signal of the flip-flop and the other output lead, the 1 output lead, delivers a 1 output signal. The symbol identified by reference numerals 21 and 22 in FIG. 1 represent such flip-flops.

The AND-gates disclosed in FIG. 1 provide the logical operation of conjunction for binary 1 signals applied thereto. In the system disclosed, a binary 1 is represented by a positive signal, and the AND-gate provides a positive output signal representing a binary 1 when, and only when, all of the input signals applied thereto are positive and represent binary 1's. The symbols identified by reference numerals 24, 25, 26 and 27 in FIG. 1 are AND-gates each having three input terminals. Such AND-gates deliver a binary 1 output signal only when all three of the input signals applied thereto are positive and represent binary 1's.

The OR-gates disclosed in FIG. 1 provide the logical operation of inclusive OR for positive input signals applied thereto. The OR-gate provides an output signal representing a binary 1, when any one or more of the input signals applied thereto represent binary 1's. The symbols identified by reference numerals 30 and 31 in FIG. 1 are OR-gates each having two input terminals. Such an OR-gate delivers a binary 1 output signal when either of the input signals applied thereto is positive and represents a binary 1.

When it is desired that motor 15 rotate in a forward direction, a command pulse or signal representing a positive voltage is applied to terminal 19 from an external source of signals such as a tape handler controller, not shown. This signal at terminal 19 set flip-flop 21 causing a positive signal from its 1 output terminal to be applied to an input terminal of AND-gate 24 and to an input terminal of AND-gate 27. This command signal illustrated by waveform A in FIG. 2 and applied to terminal 19 is coupled through OR-gate 30 and capacitor 71 to the set input terminal of vernier flip-flop 22. The setting of flip-flop 22 generates a positive signal at its 1 output terminal which is coupled through OR-gate 31 to an input terminal 73 of switch controller 12. This signal is then transmitted from terminal 73 to a base 74 of a transistor 75. Since transistor 75 is a PNP transistor the positive signal applied to its base renders transistor 75 nonconductive. The positive signal at terminal 19 is transferred through OR-gate 30 to a second terminal of AND-gate 24 and is also applied through a coupling capacitor 41 to the T or trigger input terminal of a pulse-pedestal flip-flop 34. Pulse-pedestal flip-flop 34 is a circuit similar to flip-flop 21 differing only in that it requires the simultaneous application of two positive input signals to transfer it from one stable state to another stable state. When a positive signal is applied to the set input terminal of flip-flop 34, the flip-flop is enabled and will be set upon the simultaneous application of a positive trigger signal to its T input terminal, if it is not already in its set or 1-state. When a positive signal is applied to its reset terminal, flip-flop 34 is enabled and will be transferred to its reset or 0-state upon the simultaneous application of a positive trigger signal to its T input terminal, if it is not already in its reset state.

Monostable multivibrator 37, shown in FIG. 1, is a circuit similar to the circuit of flip-flop 21 differing only in that it operates in one stable state rather than two. It transfers from its reset state in which it is normally operating to its set state upon the application of a trigger signal thereto. In its set state, the monostable multivibrator represents the binary 1 (1-state) and in the reset state, the binary 0 (0-state). The lead entering the left-hand side of the monostable multivibrator symbol shown in FIG. 1 provides the set input signal. When the signal transmitted to the set input terminal is positive, the monostable multivibrator is transferred to its 1-state. It will stay in this set state for a predetermined time depending on the time delay rating of the multivibrator and will then automatically return to its stable state (i.e. its reset state). Because the monostable multivibrator returns by itself to its reset state, no input reset signal is required. The period of time the multivibrator remains in its set state can be controlled by the selection of electronic components used to build the monostable multivibrator circuit. Other monostable multivibrators in FIG. 1 are represented by the symbol identified by the reference numerals 38 and 39.

When a signal representing a positive voltage is initially applied to input terminal 19, monostable multivibrator 37 is in its stable state and transmits a positive signal to the set input terminal of flip-flop 34. This signal together with the positive signal transmitted through capacitor 41 to the trigger terminal T of flip-flop 34 transfers flip-flop 34 to its 1-state thereby transmitting a positive signal from its 1 output terminal to an input terminal of AND-gate 24. Since all three input signals to AND-gate 24 are now positive, conjunction occurs therein resulting in the transmission of a positive signal to terminal 43 and base 45 of transistor 46. This positive signal at base 45 of transistor 46 renders transistor 46 nonconductive causing a minus 18 volts applied to terminal 49 to be coupled through resistor 50 to an input terminal 52 of the electronic power switch 14.

Electronic power switch 14 comprises four PNP transistors 54, 55, 56 and 57 connected in a bridge circuit arrangement so that a single power supply can be used to drive motor 15 in either a forward or a reverse direction by supplying current in either a forward or a reverse direction through the motor. A voltage applied to input terminal 52 of the electronic power switch 14 is transferred from terminal 52 to the base of transistors 54 and 57. Since transistors 54 and 57 are PNP transistors, a negative voltage applied to the base renders transistors 54 and 57 conductive. When they are rendered conductive, a current $I_1$ flows from ground through a resistor 95, emitter 61, and collector 62 of transistor 54, motor 15, emitter 66 and collector 68 of transistor 57 to terminal 70. When transistors 46 and 75 of the switch controller 12 are nonconductive, the voltage at input terminal 52 of switch 14 is approximately a minus 18 volts as shown in waveform J of FIG. 2, so that transistors 54 and 57 of switch 14 are rendered fully conductive and substantially all of the 16 volts from the power supply connected to terminal 70 is applied to motor 15 as shown in waveform K of FIG. 2. This voltage quickly brings motor 15 to normal running speed in the forward direction.

After the motor reaches running speed, only a part of the 16 volts from the power supply is applied to motor 15 when it is desired to increase its speed. This reduction in the voltage applied to the motor causes the motor speed to increase more slowly so that motor speed varies only a small amount. This reduction in voltage applied to the motor is obtained when transistor 75 in switch controller 12 is rendered conductive. For example, when transistor 46 is nonconductive and transistor 75 is conductive, a current $I_2$ flows from terminal 79 through transistor 75, resistor 80, diode 81 and resistor 50 to terminal 49. Current $I_2$ produces a voltage drop of the plurality shown across resistor 50 so that the voltage at input terminal 52 is approximately a minus 9 volts. The minus 9 volts at terminal 52 causes transistors 54 and 57 to be partially conductive so that there is a voltage drop of approximately 5 volts across each of the transistors 54 and 57 and only 6 volts is applied to motor 15. This 6 volts causes the motor speed to increase at a much lower rate than when the 16 volts is applied to the motor.

When motor 15 rotates, an optical tachometer 72 coupled to the motor shaft develops tachometer pulses having a frequency directly proportional to the motor speed. These tachometer pulses are shown in waveform B of FIG. 2. The tachometer pulses are applied to the T terminal of flip-flop 34 and also to an input terminal 76 of a standard timing generator which comprises monostable multivibrators 37 and 38. Each tachometer pulse applied to the set input terminal of monostable multivibrator 38 causes the monostable multivibrator 38 to transfer to its unstable state and causes the voltage at the 0 output terminal of the multivibrator to change to a binary 0 as shown in waveform C of FIG. 2. When multivibrator 38 returns to its stable or 0-state, a positive pulse from the 0 output terminal is coupled through a capacitor 77 to the set input terminal of multivibrator 37. This positive pulse causes multivibrator 37 to transfer to its unstable state and to apply a positive voltage from its 1 output terminal to the reset terminal of flip-flop 34 as shown in waveform D of FIG. 2. Thus, each tachometer pulse applied to the set input terminal of multivibrator 38 initiates a complete timing interval. This timing interval inclu sedthe duration of time that multivibrator 38 is in the unstable state and the duration of time that multivibrator 37 is in its unstable state. This total timing interval or duration of a timing signal is represented by the time from $t_2$ to $t_4$ as shown in waveforms C and D of FIG. 2.

When the motor speed increases to a predetermined running speed, the duration of time between the tachometer pulses is less than the duration of the timing signal. At this time, power is removed from motor 15 and the motor is allowed to coast. The first coasting action occurs at time $t_8$ as shown in waveforms B, D and G of FIG. 2. At this time a tachometer pulse is applied to the T input terminal of flip-flop 34 simultaneous with the application of a positive pulse at its reset terminal causing flip-flop 34 to reset and to generate a positive signal at its 0 output terminal. The binary 0 at its 1 output terminal disables AND-gate 24 so that a positive signal is no longer generated at its output terminal or applied to base 45 of transistor 46. Transistor 46 is now rendered conductive thereby providing a slightly positive voltage at the input terminal 52 of the electronic power switch 14. This positive voltage at terminal 52 renders transistors 54 and 57 nonconductive so that current no longer flows through motor 15, and motor 15 is allowed to coast. When flip-flop 34 is reset, the positive signal at its 0 output terminal causes vernier flip-flop 22 to reset. When flip-flop 22 resets, it no longer provides a positive signal from its 1 output terminal to the base of transistor 75 and transistor 75 is rendered conductive.

Motor 15 coasts until its speed decreases below a predetermined value. When its speed is below this value, the tachometer pulses occur at the same time that a positive signal from multivibrator 37 is applied to the set input terminal of flip-flop 34. Flip-flop 34 is then set and a positive signal at its 1 output terminal is transmitted to AND-gate 24 causing conjunction to occur therein. The output signal generated by AND-gate 24 causes switch controller 12 to turn on switch 14. Vernier flip-flop 22 remains reset thereby retaining transistor 75 conductive. The voltage at input terminal 52 of switch 14 remains at approximately a minus 9 volts as described above. A voltage drop of only 6 volts is applied across motor 15 so that its speed increases slowly to running speed.

Each time the motor speed increases slightly above a predetermined running speed, pulses from the optical tachometer occur at the same time that positive pulses are applied from the monostable multivibrator 37 to the reset terminal of flip-flop 34. AND-gate 24 will be disabled and motor 15 will coast. Each time the motor speed decreases slightly below running speed, 6 volts will be applied to the motor until the motor speed again increases to a value slightly above running speed. Thus, the motor speed varies continuously from a speed slightly below the predetermined running speed of the motor to a speed slightly above this predetermined running speed.

When a signal representing a positive command voltage is no longer applied to the input terminal 19, a "reverse" current may be applied to the motor windings to quickly stop the motor. This reverse current is applied to the motor for a predetermined duration of time known as the "braking period." When the voltage at input terminal 19 is no longer of a positive value representing a binary one, the output signal of OR-gate 30 represents a binary 0. This signal applied to the input terminal of AND-gate 24 disables it so that a positive signal is no longer generated by it as an output signal and applied to base 45 of transistor 46. Transistor 46 is thus rendered conductive thereby providing a slightly positive voltage at input terminal 52 of the power switch 14. This positive voltage renders transistor 54 and 57 nonconductive so that current $I_1$ does not flow through motor 15.

When a signal representing a positive voltage is no longer applied to input terminal 19, i.e., the potential level of terminal 19 represents a binary 0, a signal representing the binary 0 is applied to OR-gate 30. Since conjunction does not occur in OR-gate 30, a signal representing a binary 0 is applied to inverter 84. The inverter disclosed provides the logical operation of inversion for an input signal applied thereto. Thus, inverter 84 provides a positive output signal representing a binary 1 when the input signal applied thereto represents a binary 0. Conversely, the inverter provides an output signal representing a binary 0 when the input signal represents a binary 1. The symbols in FIG. 1 identified by the reference numerals 84, 85 and 86 represent such inverters.

The signal representing binary 0 applied to inverter 84 is inverted and applied to the set input terminal of the monostable multivibrator 39 causing monostable multivibrator 39 to transfer to its unstable state during the braking period of the motor and to produce a signal representing a binary 1 at its 1 output terminal, at time $t_{30}$, as shown, in waveform I of FIG. 2. This signal and a signal representing a binary 1 from flip-flop 21 are applied to the input terminals of AND-gate 27. The signal representing a binary 0 generated at the output terminal of OR-gate 30 is also inverted by inverter 86 and applied to a third input terminal of AND-gate 27. These input signals cause conjunction to occur in AND-gate 27 resulting in an output signal being generated representing a binary 1 which is transmitted to the input terminal 44 of switch controller 12. The signal representing a positive voltage at terminal 44 is applied to base 87 of transistor 88 so that transistor is rendered nonconductive. A minus 18 volts at terminal 93 is now coupled through a resistor 94 to the input terminal 53 of the electronic power switch 14 and is applied to the base of transistors 55 and 56.

A negative voltage at the base of transistors 56 and 55 renders these transistors conductive. A reverse current $I_3$ now flows from ground through resistor 95, emitter and collector of transistor 55, terminal 65, motor 15, emitter and collector of transistor 56 to terminal 70.

When the signal at the output terminal of OR-gate 30 representing a binary 0 is applied to inverter 85, conjunction occurs in OR-gate 31 and an output signal representing a binary 1 is applied to the input terminal 73 of switch controller 12 rendering transistor 76 nonconductive. A minus 18 volts from terminal 93 is now applied to the input terminal 53 of the electronic power switch 14, as described above. This minus 18 volts assures that substantially all of the 16 volts from the power supply connected to terminal 70 is applied to the motor. This voltage quickly brings the motor to a stop.

To prevent excessive current from causing damage to motor 15, a current limiting circuit comprising a current sensing means such as potentiometer 95 and a transistor 100 are employed to sense the value of the current through the motor and to feedback a current limiting signal to the switch input terminals 52 and 53. When current through potentiometer 95 increases to a predetermined value, transistor 100 is rendered conductive and provides a current which changes the voltage at the switch input terminals. For example, if the motor is rotating in a forward direction, an excessive current through potentiometer 95 renders transistor 100 conductive so that a current $I_4$ flows from terminal 102 through transistor 100, diode 81 and resistor 50 to terminal 49. This current produces a voltage drop of the polarity shown across resistor 50 and decreases the negative voltage at input terminal 52 of switch 14. This decrease in negative voltage at terminal 52 increases the voltage drop across transistors 54 and 57 and decreases the voltage applied across motor 15. This decrease in voltage across motor 15 decreases the current through the motor.

When it is desired that the motor be rotated in a reverse direction, a positive command signal is applied to input terminal 18. This positive signal at terminal 18 generates a signal which resets flip-flop 21 thereby applying a signal representing a positive voltage from its 0 output terminal to input terminals of AND-gate 26 and AND-gate 25. The signal at terminal 18 is also coupled through OR-gate 30 and capacitor 41 to the T terminal of pulse-pedestal flip-flop 34. A signal representing a positive voltage from multivibrator 37 applied to the set input terminals. For example, if the motor is rotating in junction to occur therein. The 1 output terminal of flip-flop 34 now generates a signal representing a positive voltage which is transmitted to another input terminal of AND-gate 26. Since all three signals to the input terminals of AND-gate 26 are now positive, an output signal representing a positive voltage is generated which is transmitted to terminal 44 and base 87 of transistor 88. The positive voltage at base 87 of transistor 88 renders transistor 88 nonconductive so that a minus 18 volts is now applied to terminal 93 and is coupled through resistor 94 to input terminal 53 of the electronic switch 14. This negative voltage renders transistor 55 and 56 conductive so that a reverse current flows through motor 15 causing the motor to rotate in the reverse direction. Control of the motor speed is provided by the speed regulator 16 and the switch controller 12 as described above.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A system for controlling the speed and direction of operation of a motor in response to a plurality of forward and reverse command signals, said system comprising: a speed sensing means coupled to said motor for developing a plurality of pulses having a time duration between said pulses determined by the speed of said motor; a timing generator for developing timing signals having a predetermined time duration; comparison logic circuitry for comparing the time duration of said timing signals with the time duration between the pulses of said sensing means, said logic circuitry being coupled to said speed sensing means and to said generator and providing a speed control signal when the time duration between the pulses of said sensing means is greater than the time duration of one of said timing signals; first and second signal input terminals, said first input terminal being coupled to receive said forward command signals, said second input terminal being coupled to receive said reverse command signals; a switch controller, said controller being coupled to said first and said second input terminals and said logic circuitry; said speed control signal causing said switch controller to provide actuating signals in response to said command voltages; and an electronic power switch, said switch being coupled to said switch controller and to said motor, said actuating signals causing said switch to provide power to said motor to increase motor speed.

2. A system as defined in claim 1 wherein: said timing generator comprises a monostable multivibrator, said multivibrator being coupled to said speed sensing means, each of said pulses of said sensing means causing said multivibrator to develop a timing signal having a predetermined time duration.

3. A system as defined in claim 1 wherein: said comparison logic circuitry comprises means for providing a first and a second speed control signal, said first speed control signal being provided prior to the time said motoı initially reaches a predetermined running speed, said second speed control signal being provided when said motor speed subsequently decreases below said predetermined running speed, said first speed control signal causing said switch controller to provide a first actuating signal, said second speed control signal causing said switch controller to provide a second actuating signal, said first actuating signal causing said switch to provide full power to said motor, said second actuating signal causing said switch to provide partial power to said motor.

4. A system as defined in claim 1 including: logic circuitry for interconnecting said first and second input terminals with said switch controller and for providing a motor stopping signal when said command signals are removed from said signal input terminals, said motor stopping signal having a predetermined time duration, said stopping signal causing said switch controller to provide a switch actuating signal, said switch actuating signal actuating said switch to stop said motor.

5. A system as defined in claim 1 including: logic circuitry for interconnecting said first and second input terminals with said switch controller and for providing a motor stopping signal when said command signals are removed from said signal input terminals, said motor stopping signal having a predetermined time duration, said stopping signal causing said switch controller to provide a switch actuating signal, said switch actuating signal causing said switch to provide full stopping power to said motor, and wherein: said comparison logic circuitry comprises means for providing a first and a second speed control signal, said first speed control signal being provided prior to the time said motor initially reaches a predetermined running speed, said second speed control signal being provided when said motor speed subsequently decreases below said predetermined running speed, said first speed control signal causing said switch controller to provide a first actuating signal, said second speed control signal causing said switch controller to provide a second actuating signal, said first actuating signal causing said switch to provide full power to said motor, said second actuating signal causing said switch to provide partial power to said motor.

6. A system as defined in claim 1 wherein: said electronic power switch provides current in either direction through said motor from a single power supply and said comparison logic circuitry comprises means for providing a first and a second speed control signal, said first speed control signal being provided prior to the time said motor initially reaches a predetermined running speed, said second speed control signal being provided when said motor speed subsequently decreases below said predetermined running speed, said first speed control signal causing said switch controller to provide a first actuating signal, said second speed control signal causing said switch controller to provide a second actuating signal, said first actuating signal causing said switch to provide full power to said motor, said second actuating signal causing said switch to provide partial power to said motor.

No references cited.

ORIS L. RADER, *Primary Examiner.*

GENE RUBINSON, *Assistant Examiner.*

U.S. Cl. X.R.

318—326, 329, 341